April 24, 1934.   J. H. VICTOR   1,956,183
GASKET
Filed March 7, 1932
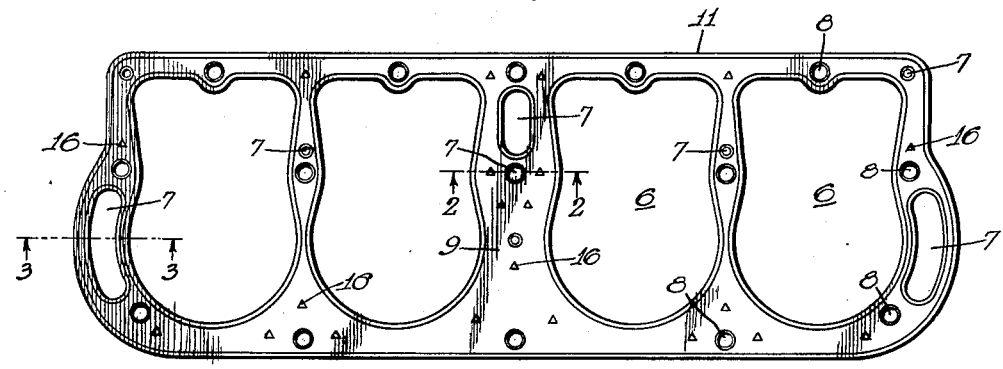
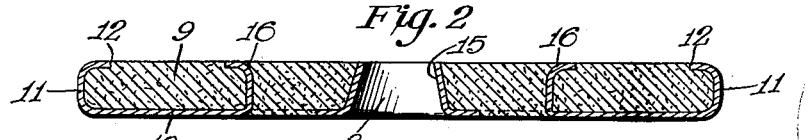
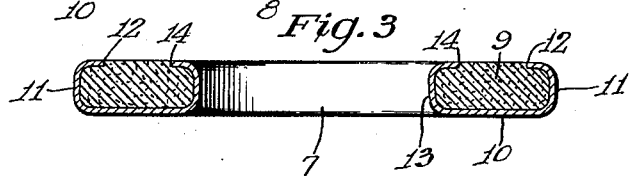
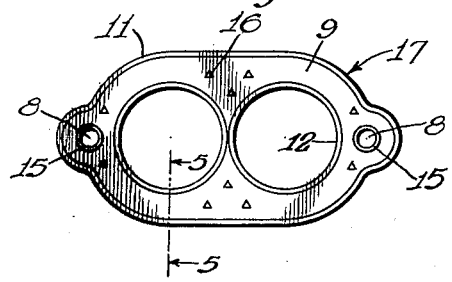
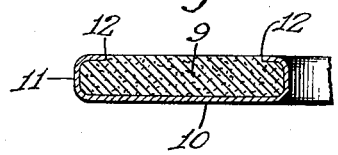
Inventor:
John H. Victor
By: Wm O Belt
Atty.

Patented Apr. 24, 1934

1,956,183

UNITED STATES PATENT OFFICE 1,956,183

GASKET

John H. Victor, Evanston, Ill., assignor to Victor Manufacturing & Gasket Company, Chicago, Ill., a corporation of Illinois Application March 7, 1932, Serial No. 597,295

1 Claim. (Cl. 288—1)

This invention is a division in part of my application Serial No. 521,143 filed March 9, 1931 and it relates to gaskets of the kind used to seal joints subjected to high temperatures in internal combustion engines and the like.

The primary object of this invention is to provide a two-piece gasket of novel and simple construction which can be easily applied to a joint and which will come off with the removable part when the joint is opened.

Another object of the invention is to provide a two-piece gasket consisting of a single metal facing layer and a layer of gasket material intended to be arranged in a joint with the metal facing layer against the block and the gasket material layer against the head or the manifold or other removable part, the edges of the gasket material being protected by integral flanges on the metal layer at the periphery of the gasket and at the port openings therein and the gasket material being secured to the metal layer at said edges and intermediate thereof to hold the gasket material in place on the metal layer.

And another object of the invention is to provide a gasket having a layer of gasket material and a single metal facing layer suitably united and provided with bolt openings, the edges of the metal layer at the bolt openings being bent inwardly to form tapered flanges protecting the edges of the gasket material at the bolt openings and serving as guide and centering means for the gasket when being engaged with the bolts.

I have illustrated the invention in selected embodiments in the accompanying drawing wherein Fig. 1 is a plan view of a cylinder head gasket embodying the invention.

Figs. 2 and 3 are enlarged sectional views on the lines 2—2 and 3—3 respectively of Fig. 1.

Fig. 4 is a plan view of a marginal gasket embodying the invention, and

Fig. 5 is a sectional view on the line 5—5 of Fig. 4.

Referring to the drawing, the cylinder head gasket, Figs. 1-3, has a plurality of cylinder openings 6, water openings 7, and bolt openings 8 which are registered in the layer 9 of asbestos or other gasket material and the layer 10 of copper or other suitable metal. The metal layer 10 is provided peripherally and at the combustion openings with integral flanges 11 which enclose the edges of the gasket material layer and are folded over and embedded in the upper face thereof at 12. The metal layer 10 is also provided with integral flanges 13 which enclose the edges of the gasket material layer at the water openings and these flanges are folded over the edges of the gasket material layer and are embedded in the upper face thereof at 14. The edges of the flanges 11 and 13 are oppositely disposed and are embedded in the upper face of the gasket material layer and lie flush with the surface of said layer between the flanges. The metal layer is bent inwardly at the bolt openings 8 to form integral flanges 15 which taper from the metal facing layer toward the opposite face of the gasket and these flanges terminate at or about the outer face of the gasket material layer and protect the edges of the gasket material at the bolt openings from contact with the bolts with which the gasket is engaged and also provide guides for centering the gasket on the bolts. The gasket thus comprises a single metal layer, which preferably constitutes the bottom of the gasket, and a layer of gasket material which is superimposed upon the metal layer and is protected at its peripheral edge by the flange 11 on the metal layer and at the edges of its port openings by flanges 13 on the metal layer, and is also protected at the bolt openings by flanges 15 on the metal layer.

A cylinder head gasket with metal on both sides is just as likely to stay on the block as it is to come off with the head when the joint is opened; a gasket with gasket material on both sides of an interposed metal core is liable to stick to the block and to the head and to be pulled apart or distorted when the joint is opened. This not only damages the gasket against further efficient use but it increases the work of the repair man and makes it necessary to clean the face of the joint on the block and, in doing so, the dirt may enter the cylinder and other openings in the block and cause damage thereafter in the operation of the engine. The head may be cleaned on a bench and if any dirt gets in the openings therein it can be easily removed. When the head of the engine is taken off to remove the carbon from the combustion chambers, to grind the valves, to install new pistons or piston rings, or to do work on the engine, it is important that the gasket should be removed from the block so that it will not become damaged. It is much easier to remove the gasket from the block by having it stick to the head and to remove it with the use of tools after the head has been removed because there are numerous bolts on the block which projects through the gasket and increase the difficulty of removing the gasket manually. For these and other reasons it is highly desirable that the gasket should come off with the head and, for this reason, I provide the gasket with a metal facing to lie against the block and with a gasket material facing to lie against the head. The metal facing will not ordinarily stick to the block but the gasket material facing will almost always stick to the head. But it is important that the gasket should not stick to the head so tightly that it will be damaged against further use if it becomes necessary to remove it from the head and my invention provides means on and integral with the metal layer for retaining the gasket material layer thereon. The flanges 11 and 13 are folded over and upon and are embedded in the upper face of the gasket material layer and serve to hold this layer in unitary assembly with the metal layer, but in different gaskets there will be spaces of considerable area between the flanges 11 and 13 where the gasket material layer will not be fastened to the metal layer and, while it is believed that the flanges 11 and 13 will always hold the gasket material and the metal layer in unitary assembly for initial installation, there is the liability that the asbestos layer may stick to the face of a joint and resist removal to an extent which will result in distortion or other damage to the asbestos layer in these larger areas and thereby reduce if not destroy the efficiency of the gasket for further use. To prevent this I strike up prongs 16 from the metal layer and embed these prongs in the gasket material layer and clench them thereon. These prongs will be located as found desirable in those areas of the gasket where the gasket material is liable to stick to the joint face and resist removal. The prongs hold the gasket material in unitary assembly with the metal layer and prevent the gasket material from scaling off or pulling away from the metal layer due to adhesion to the face of the joint. The prongs cooperate with the flanges to preserve the gasket material in its original condition so that the gasket may be used again.

The block is provided with bolts to receive the head and the flanges 15 for the bolts are tapered to receive the bolts and center the gasket on the head. My invention provides a novel and simple but efficient gasket which is suitable for many purposes and is capable of being re-used without impairment of its efficiency. I may graphite the exposed surface of the gasket material or saturate or otherwise treat the gasket material to protect it in handling, and this treatment will to some extent tend to prevent the gasket from adhering to the face of the joint, but any such treatment is not an absolute and enduring preventive against sticking, except at prohibitive cost, and hence the necessity of providing the flanges and prongs to retain the gasket material layer in unitary assembly with the metal layer, to prevent air pockets forming between the layers, to prevent the gasket material layer from swelling or warping, and to retain the layers in unitary assembly. The metal layer will adapt itself readily to the face of the joint on the block and the gasket material layer will adapt itself to any imperfections in the face of the joint on the head which is only roughly machined.

The invention is also applicable to a manifold gasket 17, Fig. 4, and to other forms of gaskets for which it is or may be adapted. In the case of a manifold gasket it is preferred that the metal layer be placed against the block and the gasket material layer against the manifold.

I do not limit the invention to the particular gaskets shown in the drawing but reserve the right to embody it in other gaskets and with such changes in the form, construction and arrangement of parts as may be necessary to adapt it for different conditions, within the scope of the following claim.

I claim:

A gasket having bolt openings therein and comprising a single metal facing layer and a layer of gasket material superimposed upon the metal facing layer, and prongs struck upwardly from the metal facing layer for retaining the gasket material layer in unitary assembly therewith, the edges of the gasket facing layer at the bolt openings being folded into the bolt openings in the gasket material layer to form tapered flanges in said openings, said flanges tapering from the metal facing layer toward the opposite face of the gasket and having the free edges thereof extending toward but not folded upon the outer face of the gasket material layer.

JOHN H. VICTOR.